United States Patent [19]
Holzgrefe et al.

[11] Patent Number: 6,050,507
[45] Date of Patent: Apr. 18, 2000

[54] PERFORATED DISC AND VALVE COMPRISING THE SAME

[75] Inventors: Volker Holzgrefe, Ditzingen; Stefan Arndt, Stuttgart; Nikolaus Simon, Murnau; Frank Schatz, Kornwestheim; Heinz Fuchs, Stuttgart; Günter Dantes, Eberdingen; Detlef Nowak, Untergruppenbach; Jörg Heyse, Markgröningen; Beate Ader, Stuttgart, all of Germany

[73] Assignee: Robert Bosch GmbH, Stuttgart, Germany

[21] Appl. No.: 09/077,140

[22] PCT Filed: Sep. 5, 1997

[86] PCT No.: PCT/DE97/01952

§ 371 Date: May 21, 1998

§ 102(e) Date: May 21, 1998

[87] PCT Pub. No.: WO98/13601

PCT Pub. Date: Apr. 2, 1998

[30] Foreign Application Priority Data

Sep. 26, 1996 [DE] Germany ............ 196 39 506

[51] Int. Cl.[7] ............................................. B05B 1/30
[52] U.S. Cl. .................................. 239/585.1; 239/596
[58] Field of Search ................... 239/585.1, 585.2, 239/585.3, 585.4, 585.5, 596, DIG. 19

[56] References Cited

U.S. PATENT DOCUMENTS

| | | | |
|---|---|---|---|
| 4,828,184 | 5/1989 | Gardner et al. | 239/590.3 |
| 5,383,597 | 1/1995 | Sooriakumar et al. | 239/DIG. 19 X |
| 5,449,114 | 9/1995 | Wells et al. | 239/DIG. 19 X |
| 5,492,277 | 2/1996 | Tani et al. | 239/585.5 |
| 5,685,491 | 11/1997 | Marks et al. | 239/585.3 X |
| 5,766,441 | 6/1998 | Arndt et al. | 239/596 X |

FOREIGN PATENT DOCUMENTS 483 615  10/1929  Germany.

*Primary Examiner*—Lesley D. Morris
*Attorney, Agent, or Firm*—Kenyon & Kenyon

[57] ABSTRACT

The orifice plate has a complete fluid passageway including inlet orifices, outlet orifices and at least one channel (cavity) disposed between them. The at least three functional levels of the orifice plate, having in each case a characteristic orifice structure, are constructed one on top of the other through electrodeposition (multi-layer electroplating), so the orifice plate is embodied in one piece. Because the orifice plate should be hydraulically unthrottled if the available plate surface is small, the inlet orifices are created with the largest possible circumferences. The orifice plate is particularly suited for use at injection valves, in paint nozzles, inhalers or ink-jet printers, in freeze-drying methods, for spraying or injecting fluids, or for atomizing medications.

31 Claims, 11 Drawing Sheets

PERFORATED DISC AND VALVE COMPRISING THE SAME

FIELD OF THE INVENTION

The present invention relates to an orifice plate and to a valve having an orifice plate.

BACKGROUND INFORMATION

U.S. Pat. No. 4,828,184 describes a method for manufacturing nozzles in the form of orifice plates, which represent the so-called "S-type plates." What is meant by this term is that the inlet and outlet orifices in the orifice plate are offset from one another, forcing the flow of a fluid passing through the orifice plate to traverse an "S course." The orifice plates are formed by two planar silicon wafers that have been bonded, with a plurality of inlet orifices being provided in the upper, first silicon wafer and exactly one outlet orifice being provided in the lower, second silicon wafer fixedly connected to the first silicon wafer. The silicon wafers include areas of reduced thickness, so shearing gaps are formed between the orifices of the first wafer and the one orifice of the second wafer, parallel to the end faces of the wafers. The inlet and outlet orifices are created with a conventional masking technique involving etching on silicon wafers that have a plurality of orifice-plate structures. The truncated-pyramid contours for the orifices in the orifice plate result logically from the anisotropic etching technique.

U.S. Pat. No. 5,383,597 describes an orifice plate having an S-type plate construction and preferably produced from silicon. Regardless of the material used and the method of manufacture of the orifice plate, the orifice plate includes two fixedly-connected wafers that rest directly against one another and are flowed through one behind the other. The upper, first wafer is provided with a plurality of inlet orifices that open through into channel regions cut into the downstream end face of the first wafer. The lower, second wafer has a plurality of outlet orifices that extend from channel regions representing depressions at the upstream end face of the second wafer. In the assembled state of the orifice plate, the two wafers rest with one on top of the other such that the channel regions of the two wafers together form channels or cavities, which are flowed through between the inlet and outlet orifices. With the use of etching as the machining method for the silicon wafers, the inlet and outlet orifices always have a truncated-pyramid shape. The channels also have wall inclinations that are predetermined for etching by the crystal lattices of the silicon.

U.S. Pat. No. 5,449,114 describes an orifice plate, which is particularly suited for fuel-injection valves and has two fixedly-connected wafers that rest closely against each other. An orifice plates have a silicon or a plurality of metals, which are embodied such that a single inlet orifice extends in the upper, first wafer and opens through into a trench, which serves as a channel, at the downstream end face of the upper, first wafer. Four outlet orifices that are offset from the upper inlet orifice are cut into the lower, second wafer. An offsetting of the lower outlet orifices with respect to the inlet orifice ensures that an "course" will be formed in the flow of a fluid, particularly a fuel, flowing through the orifices.

A disadvantage shared by all of the aforementioned silicon orifice plates is that their fracture strength may be insufficient due to the brittleness of silicon. The silicon wafers are at risk of fracturing in response to continuous stress, such as at an injection valve (engine vibrations). Mounting the silicon wafers on metallic components, such as injection valves, is complicated, because special stress-free securing means must be found, and the seal at the valve is problematic. It is not possible, for example, to weld the silicon orifice plates to the injection valve. A further disadvantage is wear (e.g., erosion) of the edges at the orifices of the silicon plates due to the frequent flow-through of a fluid.

Furthermore, German Patent Application No. 483 615 describes a nozzle for fuel-injection internal combustion engines, which is likewise formed by two nozzle plates that have inlet and outlet orifices that are offset with respect to one another to generate turbulence in the flowing fuel. The two metal nozzle plates are manufactured or machined with conventional techniques (stamping, pressing, rolling, cutting, boring, milling, grinding, etc.).

A common feature of all of the conventional orifice plates is that the diverse, separately manufactured and machined nozzle plates must be connected with joining methods. This is effected, for example, through bonding for silicon wafers and welding or soldering for metallic wafers. Other work processes, such as centering the individual nozzle plates with respect to one another, are required in addition to the actual connecting methods. A possible disadvantage of these time- and cost-intensive method steps is deformities of the nozzle plates.

SUMMARY OF THE INVENTION

An advantage of the orifice plate according to the present invention is that it is manufactured simply in a compact manner, and a uniform, fine atomization of a fluid through the plate can be effected without additional energy, that is, with only the available medium pressure, which results in an especially high atomization quality and a jet configuration that is adapted to the respective requirements. Consequently, with the use of such an orifice plate at a valve, particularly a fuel-injection valve of an internal combustion engine among other things, the exhaust-gas emissions of the internal combustion engine and fuel consumption can be reduced.

It is particularly advantageous to embody the orifice plate to be hydraulically unthrottled (e.g., unrestricted). To achieve this, the cross-sectional surface areas of the flow path through the orifice plate must have specific sizes and special relationships to one another. To avoid a pressure loss (pulse loss) in the entrance of the orifice plate, and to maintain a high atomization energy in the flow, an entrance cross-sectional surface area in the inner channel of the orifice plate advantageously has a higher value than an exit cross-sectional surface area. While the entrance cross-sectional surface area results as the product of the sum of the circumferences of all of the inlet orifices and the height of the channel transverse to the cross-section of all of the inlet orifices, the value of the exit cross-sectional surface area is obtained by multiplying the sum of the circumferences of all of the outlet orifices by the height of the channel. The flow passageway embodied in this manner in the orifice plate guarantees a high flow pressure or flow pulse, permitting a particularly good atomization of the fluid. In addition, it is advantageous for the sum of the cross-sectional surface areas of all of the inlet orifices to be greater than the above-described entrance cross-sectional surface area. For an orifice plate that has very small dimensions, but is nevertheless unthrottled, the cross-sectional surface area of the inlet orifice should be larger than the entrance cross-sectional surface area, which should in turn be larger than the exit cross-sectional surface area in order to attain optimum atomization.

Another advantage is that the orifice plates manufactured by means of electrodeposition are embodied in one piece, because the individual functional levels are constructed one on top of the other in deposition steps performed in direct succession. After the metal deposition has been completed, the orifice plate is in one piece, thus necessitating no time- and cost-intensive method steps for connecting individual nozzle plates. Furthermore, this eliminates the problems that arise in multi-part orifice plates when individual wafers are centered or positioned with respect to one another.

With electrodeposition, very large numbers of orifice plates can advantageously be manufactured simultaneously in a reproducible, highly-precise and cost-effective manner. Furthermore, this manufacturing method permits tremendous freedom in shaping the orifice plates, because the contours of the orifices in the plates can be selected freely. Particularly in comparison to silicon orifice plates, in which the attainable contours (truncated pyramids) are strictly predetermined by the crystal axes, flexible shaping is of great advantage. An advantage of metal deposition is that it can be employed with a very wide variety of materials, particularly in comparison to the manufacture of silicon plates. A considerable range of metals having different magnetic properties and degrees of hardness can be used in the manufacture of the orifice plate of the invention.

It is also advantageous to embody the orifice plates of the present invention in the form of S-type plates so that exotic, bizarre jet configurations can be produced. An optimum condition for an S-type plate is the provision of an offset between the inlet orifices and the outlet orifices. Offset is the distance between the edges of the inlet orifices and the edges of the associated outlet orifices that keeps the inlet and outlet orifices from overlapping. In a few cases, it can even be advantageous to provide no offset in the above-described sense, or to allow a very slight overlap that is selected to be so small that the flow still traverses an S course. All of these S-type orifice plates permit jet cross sections in countless varieties, such as rectangles, triangles, crosses and ellipses, for single-, dual- and multi-jet sprays. These unusual jet configurations permit a precise, optimum adaptation to predetermined geometries, e.g., to different intake-pipe cross sections of internal combustion engines. The resulting advantages include the shape-adapted utilization of the available cross section for a homogeneously-distributed introduction of the mixture that reduces exhaust gases, and the avoidance of wall-film deposits on the intake-pipe wall that render the exhaust gas harmful. In general, a very significant advantage of the orifice plates according to the present invention is that variations in the jet configuration are possible in a simple manner. Thus, jet configurations that include flat, conical or multiple single jets and asymmetrical (directed toward one side) jet configurations can be created particularly easily.

To maintain a high atomization energy in the flow, the inlet orifices have a meandering shape, or are bat-shaped, cross-shaped or gear-like, or are bone-shaped, sickle-shaped (crescent-shaped), T-shaped, shaped like circular-ring segments, or have some other shape, and have large circumferences. Large inlet-orifice circumferences mean relatively large entrance cross-sectional surface areas, which are particularly desirable. The cross-sectional surface area of the inlet orifices is advantageously larger than or identical to the cross-sectional surface area of the outlet orifices.

With the use of multi-layer electroplating, undercuts can be made in the orifice plate in an advantageous manner, at low cost and with extremely high precision.

DETAILED DESCRIPTION OF THE DRAWINGS

Figure 1:
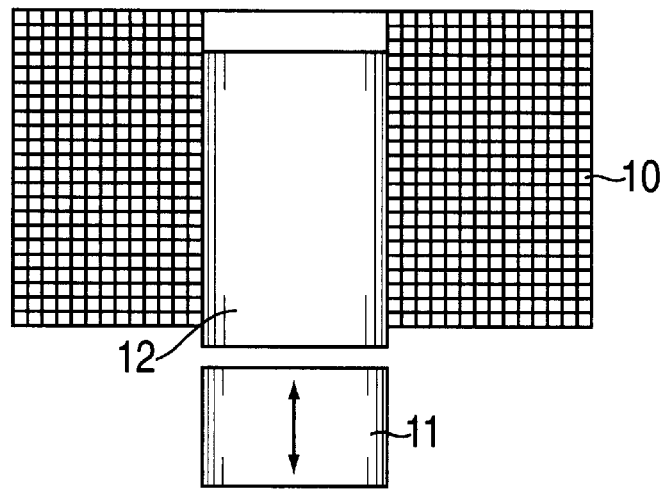
FIG. 1 shows a partial representation of an injection valve having a first orifice plate according to the present invention.
Figure 1:
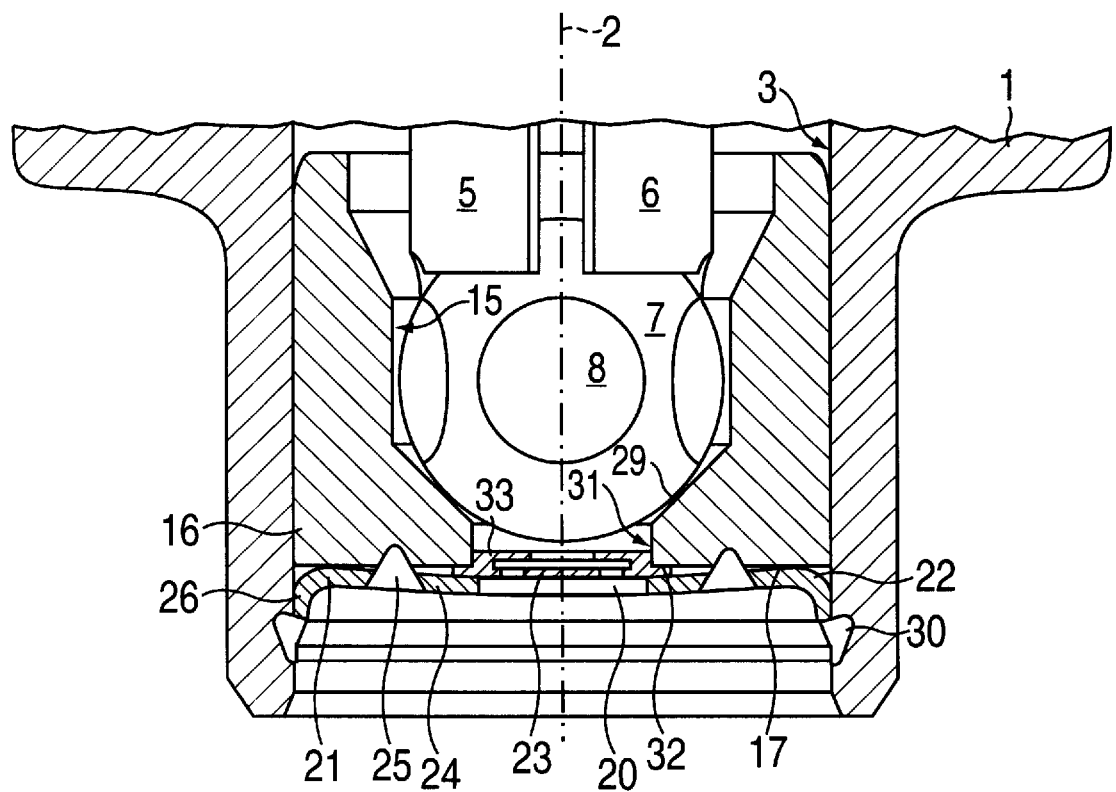

FIG. 1 shows, as an exemplary embodiment, a part of a valve in the form of an injection valve for fuel-injection systems of mixture-compressing, spark-ignited internal combustion engines. The injection valve has a tubular valve-seat carrier 1, in which a longitudinal orifice 3 is formed concentrically situated with respect to a valve longitudinal axis 2. Disposed in longitudinal orifice 3 is a valve needle 5, for example having a tubular shape, that is fixedly connected at its downstream end 6 to a valve-closing body 7, which is spherical, for example, and is provided at its circumference with, for example, with five flattened regions 8 for allowing the fuel to flow past valve closing body 7.

The injection valve is actuated in a conventional manner, for example electromagnetically. A schematically-indicated electromagnetic circuit includes a magnet coil 10, an armature 11 and a core 12. Core 12 moves in the axial movement of valve needle 5, and to open the injection valve counter to the spring force of a restoring spring, not shown, and the closing of the valve. Armature 11 is connected to the end of valve needle 5 that faces away from valve-closing body 7, for example by a weld seam made by a laser, and is oriented toward core 12.

Serving to guide valve-closing body 7 during the axial movement is a guide orifice 15 of a valve-seat body 16, which is mounted tightly through welding into the downstream end of valve-seat carrier 1, which end faces away from core 12, in longitudinal orifice 3 extending concentrically to valve longitudinal axis 2. At its lower end face 17 facing away from valve-closing body 7, valve-seat body 16 is concentrically and fixedly connected to, e.g., a pot-shaped orifice-plate carrier 21, which thereby rests, with at least one outer annular region 22, directly against valve-seat body 16. Orifice-plate carrier 21 has a similar shape to conventional pot-shaped injection orifice plates. A central region of orifice-plate carrier 21 is provided with a throughgoing orifice 20 that has no metering function.

An orifice plate 23 embodied according to the present invention is disposed upstream of throughgoing orifice 20 so as to completely cover orifice 20. Orifice plate 23 only represents an insertable part that can be inserted into orifice-plate carrier 21. Orifice-plate carrier 21 is embodied with a bottom part 24 and a retaining edge 26. Retaining edge 26 extends axially, facing away from valve-seat body 16, and bends outward in conical fashion up to the end of the valve-seat body. Bottom part 24 is formed by outer annular region 22 and central throughgoing orifice 20.

Valve-seat body 16 and orifice-plate carrier 21 are connected, for example, by a circumferential, tight first weld seam 25 formed by a laser. This type of assembly avoids the risk of an undesired deformation of orifice-plate carrier 21 in its central region with throughgoing orifice 20 and orifice plate 23 disposed upstream of it. In the region of retaining edge 26, orifice-plate carrier 21 is further connected to the wall of longitudinal orifice 3 in valve-seat carrier 1, for example by a circumferential, tight second weld seam 30.

Orifice plate 23, which can be secured between orifice-plate carrier 21 and valve-seat body 16 inside circular weld seam 25, in the region of throughgoing orifice 20, is stepped, for example. An upper orifice-plate region 33 having a smaller diameter than a base region 32 projects with dimensional accuracy into a cylindrical exit orifice 31 of valve-seat body 16 downstream of a valve-seat surface 29. A press-fit can also be provided for this area of the orifice-plate region 33/exit orifice 31. The base region 32 of orifice plate 23, which region projects radially beyond orifice-plate region 33, and can therefore be clamped, rests against lower end face 17 of valve-seat body 16, so bottom part 24 of orifice-plate carrier 21 is spaced slightly from end face 17 at this location. While orifice-plate region 33 encompasses, for example, two functional levels, namely a center and an upper functional level of orifice plate 23, one lower functional level alone forms base region 32. A functional level should possess a substantially constant orifice contour over its axial extension.

The depth to which the valve-seat part including valve-seat body 16, pot-shaped orifice-plate carrier 21 and orifice plate 23 is inserted into longitudinal orifice 3 determines the magnitude of the stroke of valve needle 5, because one end position of valve needle 5 is determined by the contact of valve-closing body 7 with valve-seat surface 29 of valve-seat body 16 when magnetic coil 10 is not excited. The other end position of valve needle 5 is determined, for example, by the contact of armature 11 with core 12 when magnetic coil 10 is excited. The path between these two end positions of valve needle 5 thus represents the stroke. The spherical valve-closing body 7 interacts with valve-seat surface 29 of valve-seat body 16, the surface tapering in frustoconical fashion in the flow direction and being embodied in the axial direction between guide orifice 15 and lower exit orifice 31 of valve-seat body 16.

The orifice plate 23, disposed in exit orifice 31 of valve-seat body 16 and held directly against end face 17 of valve-seat body 16 by orifice-plate carrier 21, is shown in an exemplary simplified form in FIG. 1, and is described in detail below. Inserting orifice plate 23 with an orifice-plate carrier 21 and clamping as a securing means is only one possible variant for mounting orifice plate 23 downstream of valve-seat surface 29. Such clamping as a means of indirectly securing orifice plate 23 to valve-seat body 16 has the advantage of avoiding temperature-induced deformities that could occur in processes of directly securing orifice plate 23, such as welding or soldering. Orifice-plate carrier 21 in no way represents an exclusive condition for securing orifice plate 23. Because the securing options are not an essential part of the present invention, reference is simply made here to conventional joining methods such as welding, soldering or gluing.

The orifice plates 23 shown in FIGS. 2–15 are constructed in multiple metallic functional levels through electrodeposition (multi-layer electroplating). The manufacturing process involving depth lithography and electroplating techniques yields special contouring features, a few of which are summarized below:

functional levels whose thickness is constant over the plate surface, substantially perpendicular cuts into the functional levels because of the deep-lithographic structuring, the cuts forming hollow spaces that are flowed through (manufacturing-stipulated deviations of about 3° with respect to optimum perpendicular walls can occur), desired undercuts and overlapping of the cuts with the multi-layer construction of individually-structured metal layers, cuts whose cross-sectional shapes possess arbitrary walls that are substantially axially parallel, and a one-piece embodiment of the orifice plate, because the individual metal depositions follow one immediately after the other.

At this point, a brief definition of terms is necessary, because the terms "layer" and "functional level" are used. A functional level of orifice plate 23 represents a ply over whose axial extension the contour, including the arrangement of all orifices with respect to one another and the geometry of each individual orifice, remains constant for the most part. In contrast, a layer is to be understood as the ply of orifice plate 23 that was constructed in one electroplating step. A layer can include a plurality of functional levels, however, that can be manufactured, for example, with so-called lateral overgrowth. A plurality of functional levels (e.g., in an orifice plate 23 that includes three functional levels, the center and upper functional levels) are formed in one electroplating step and represent a cohesive layer. As mentioned above, however, the respective functional levels have different orifice contours (inlet and outlet orifices, channels) from the functional level following immediately thereafter. The individual layers of orifice plate 23 are galvanically deposited consecutively, so the respectively next layer fuses to the layer below due to the electroplate adhesion, and all layers together form a one-piece orifice plate 23. The individual functional levels or layers of orifice plate 23 are therefore not comparable to individually-manufactured nozzle plates in the orifice plates known from the related art.

The method of manufacturing orifice plates 23 shown in FIGS. 1–16 is explained briefly below. A detailed description of all of the electrodeposition method steps for manufacturing an orifice plate is already given in German Patent Application No. 196 07 288.3. Because of the stringent requirements on the structural dimensions and the precision of injection increasing significance in large-scale nozzle production. Generally, a path that encourages the aforementioned creation of turbulence within the flow of the fluid, for example the fuel, is required for the flow inside the nozzle or orifice plate. A characteristic of the method of successive use of photolithographic steps (UV depth lithography) and subsequent micro-electroplating is the assurance of high precision of the structures, even on a large-surface scale, so the method is ideal for use in mass production with very large piece numbers. A plurality of orifice plates 23 can be produced simultaneously on one wafer.

The method begins with a planar, stable carrier plate that may include, for example, metal (titanium, copper), silicon, glass or ceramic. At least one auxiliary layer can optionally be electroplated onto the carrier plate in a first step. In this instance, the layer is a starting electroplate layer (e.g., Cu) required for electrical conduction for the later micro-electroplating. The starting electroplate layer can also serve as a sacrificial layer so that it is later possible to separate the orifice-plate structures simply through etching. The auxiliary layer (typically CrCu or CrCuCr) is applied, for example, through sputtering or currentless metal deposition. Following this pre-treatment of the carrier plate, a photoresist (photosensitive resist) is applied to the entire surface of the auxiliary layer.

The thickness of the photoresist should correspond to the thickness of the metal layer that will be created in the subsequent electroplating process, that is, the thickness of the lower layer or functional level of orifice plate 23. The metal structure to be created should be transferred inversely in the photoresist with the aid of a photolithographic mask. One option is to expose the photoresist directly via the mask in UV exposure (UV deep lithography).

The negative structure to the later functional level of orifice plate 23, which structure ultimately results in the photoresist, is filled with metal (e.g., Ni, NiCo) through electroplating (metal deposition). Because of the electroplating, the metal substantially conforms to the contour of the negative structure, creating a true-to-shape reproduction of the predetermined contours in the metal. To create the structure of orifice plate 23, the steps starting from the optional application of the auxiliary layer must be repeated corresponding to the desired number of layers, two functional levels, for example, being produced in one electroplating step (lateral overgrowth). Different metals that can only be used in a respectively new electroplating step, however, can also be used for the layers of an orifice plate 23. Following completion, orifice plates 23 are separated. In the process, the sacrificial layer is etched away, causing orifice plates 23 to be lifted from the carrier plate. Afterward, the starting electroplate layers are removed through etching, and the remaining photoresist is dissolved out of the metal structures.

Figure 2:
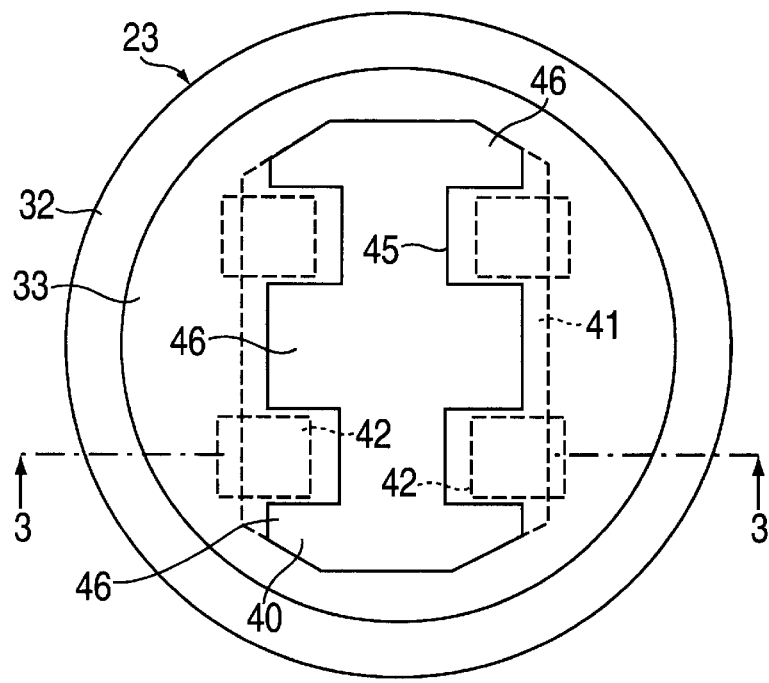
FIG. 2 shows a second orifice plate in a plan view.

FIG. 2 shows an embodiment of an orifice plate 23 in a plan view. Orifice plate 23 is embodied as a flat, circular component having a plurality of functional levels, for example three, that follow one another in the axial direction. In particular, FIG. 3, which is a sectional representation along a line III—III illustrated in FIG. 2, clarifies the structure of orifice plate 23 with its three functional levels; the lower functional level 35, which has been formed first and corresponds to the layer that has been deposited first, namely base region 32 of orifice plate 23, has a larger outer diameter than the two subsequently-formed functional levels 36 and 37, which together form orifice-plate region 33 and are produced, for example, in one electroplating step. The upper functional level 37 has an inlet orifice 40 having the largest possible circumference and a contour similar to a stylized bat (or a double-H). Inlet orifice 40 has a cross section that can be described as a partially-rounded rectangle having two oppositely-located, rectangular necks 45, and thus three inlet regions 46 that project in turn beyond necks 45. With respect to the contour, which can be compared to a bat, the three inlet regions 46 represent the body/torso and the two wings of the bat (or the crossbars to the longitudinal bar of the double-H). Four rectangular outlet orifices 42 are provided in the lower functional level 35, for example in each case with equal spacing from valve longitudinal axis 2 and therefore from the center axis of orifice plate 23, and symmetrically around the plate, for example.

The rectangular/square outlet orifices 42 lie in one plane, given a drawing projection of all of the functional levels 35, 36, 37 (shown in FIG. 2), and partially or to a great extent in necks 45 of upper functional level 37, because in the end, necks 45 also represent three sides of a rectangle. Outlet orifices 42 are offset from inlet orifice 40, that is, in the projection, inlet orifice 40 will not overlap outlet orifices 42 at any location. The degree of the offset can, however, vary in different directions. As shown in FIG. 2, for example, the offset of outlet orifices 42 laterally with respect to inlet regions 46 of inlet orifice 40 is less than the offset of outlet orifices 42 with respect to the constricted regions of inlet orifice 40.

To ensure a fluid flow from inlet orifice 40 to outlet orifices 42, a channel 41 representing a cavity is cut into center functional level 36. The size of channel 41, which has the contour of a rounded rectangular, is such that, in the projection, the channel completely covers inlet orifice 40, and projects clearly beyond inlet orifice 40, particularly in the regions of necks 45; in other words, the channel is spaced further from the center axis of orifice plate 23 than necks 45 are. As FIG. 3 clearly shows, the four outlet orifices 42 protrude beyond the outer wall of channel 41, for example partially on the side opposite necks 45. These outlet orifices 42 protruding beyond channel 41 offer the option of spraying the fluid with a large jet angle. Undercuts of this type can easily be produced with multi-layer electroplating. The ideal, perpendicular walls of all of the orifice regions 40, 41 and 42 shown in FIG. 3 can deviate by a maximum of about 3° to 4°, as dictated by the manufacturing technology, so that, seen in the flow direction, all of the orifice regions 40, 41 and 42 may taper to a minimal degree in the aforementioned angle regions, deviating from the perpendiculars.

Figure 2A:
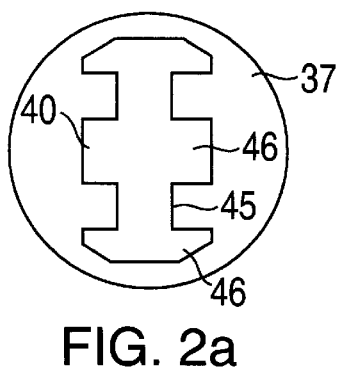
FIG. 2a shows a first functional level of the orifice plate illustrated in FIG. 2.
Figure 2B:
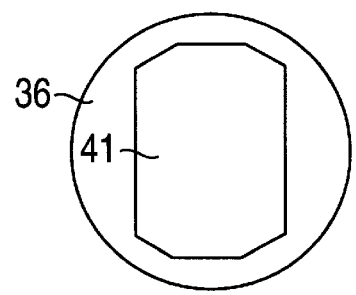
FIG. 2b shows a second functional level of the orifice plate illustrated in FIG. 2.
Figure 2C:
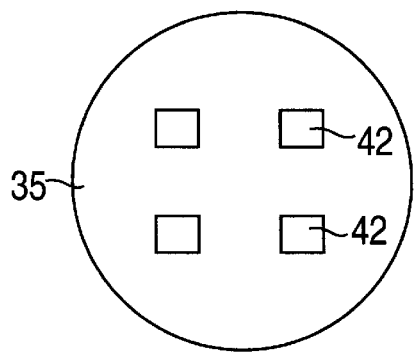
FIG. 2c shows a third functional level of the orifice plate illustrated in FIG. 2.

FIGS. 2a, 2b and 2c show functional levels 37, 36 and 35 individually to illustrate clearly the orifice contour of each individual functional level 37, 36 and 35. Each figure is a simplified, horizontal sectional representation along each functional level 37, 36 and 35. To give a more definitive picture of the orifice contours of each individual functional level 37, 36 and 35, no shading or body edges of the other functional levels are shown. The three functional levels 37, 36 and 35 together represent a one-piece orifice plate 23.

With a diameter of about 2 to 2.5 mm, orifice plate 23 is, for example, 0.3 mm thick, and functional levels 35, 36 and 37 each is, for example, 0.1 mm thick. In different embodiments, the center functional levels 36 in particular, with their channels 41 embodied as cavities, are most likely to be shaped variably with respect to the thickness of functional level 36 for easily influencing the flow (shown in FIG. 16) with the use of the ratio of the offset v of inlet orifice 40 with respect to outlet orifice 42 to the height h of cavity 41. Surfaces areas thus set transversely in channel 41 are adjusted by way of height h of channel 41, in conformance with a desired profile (shown in FIG. 18). The numbers given for the dimensions of orifice plate 23 and all further measurements disclosed in the description are intended only to facilitate understanding, and do not limit the present invention in any way. The relative dimensions of the individual structures of orifice plate 23 are also not necessarily to scale in FIGS. 1–18.

The aforementioned offset v of outlet orifices 42 with respect to the at least one inlet orifice 40 causes an S-shaped flow course of the medium, for example the fuel, which is why these orifice plates 23 are S-type plates. The medium obtains a radial-velocity component due to the radially-running channel 41. In the short, axial outlet passage, the flow does not completely lose its radial-velocity component. Instead, it emerges from orifice plate 23, lifting off from the walls of outlet orifice 42 facing inlet orifice 40 at an angle to longitudinal valve axis 2. The combination of a plurality of individual jets that can be oriented, for example, asymmetrically with respect to one another, and can be attained with a corresponding arrangement and orientation of inlet and outlet orifices 40 and 42 and channels 41, permits individual, complex, over-all jet configurations with different quantity distributions.

The so-called S course inside orifice plate 23, having a plurality of sharp flow reroutings, causes severe turbulence in the flow that encourages atomization. The velocity gradient transverse to the flow is expressed particularly strongly. It provides a change in velocity transversely to the flow, the velocity being perceptibly higher in the center of the flow than in the vicinity of the walls. The increased shearing stresses in the fluid resulting from the differences in velocities encourage the breakdown into fine droplets near outlet orifices 42. Because the flow is partially detached (lifted off the walls) in the outlet, it is not calmed due to a lack of contour guidance. The fluid at the detached side has a particularly high velocity, while the velocity of the fluid on the side of outlet orifice 42 decreases when a flow is present. The turbulence and shearing stresses that encourage atomization are therefore not eliminated in the exit.

The S course or flow detachment in the outlet produces a fine-scale (high-frequency) turbulence with transverse vibrations in the fluid, causing the jet or jets to break down into correspondingly fine droplets immediately after exiting orifice plate 23. The higher the shearing stresses caused by the turbulence, the greater the scatter of the flow vectors.

Figure 3:
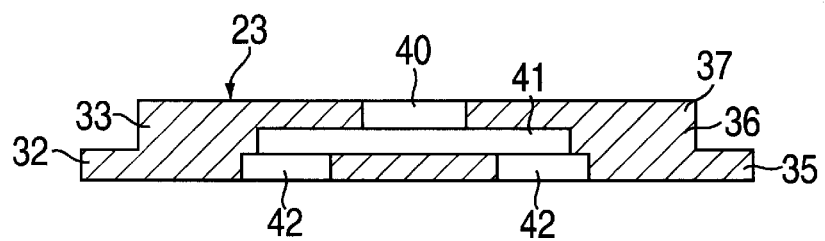
FIG. 3 shows an orifice plate in section along the line III—III illustrated in FIG. 2.

In the further exemplary embodiments described below, the parts that are identical or perform identically to those in the embodiment shown in FIGS. 2 and 3 are provided with the same reference numerals. The orifice plate 23 shown in FIG. 4 differs from the orifice plate 23 illustrated in FIG. 2 only in that channel 41 is now so large that it covers all of outlet orifices 42 in the projection. Thus, at any location at the circumference of each outlet orifice 42, the fluid flow can enter outlet orifice 42 through the protruding channel wall, even on the sides of outlet orifices 42 facing away from inlet orifice 40.

Figure 4:
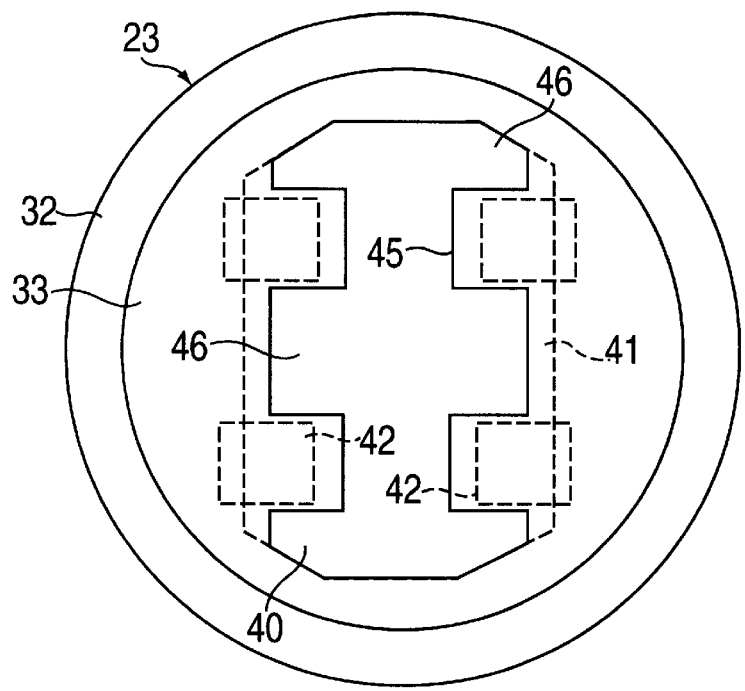
FIG. 4 shows a third orifice plate in a plan view.
Figure 4A:
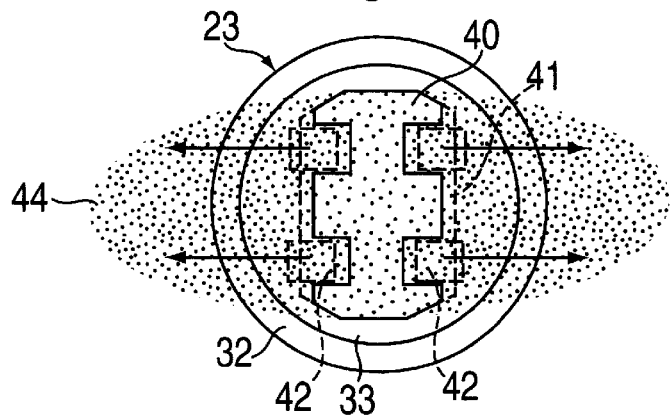
FIG. 4a shows a flat jet configuration that can be attained with the orifice plate illustrated in FIG. 4.
Figure 4B:
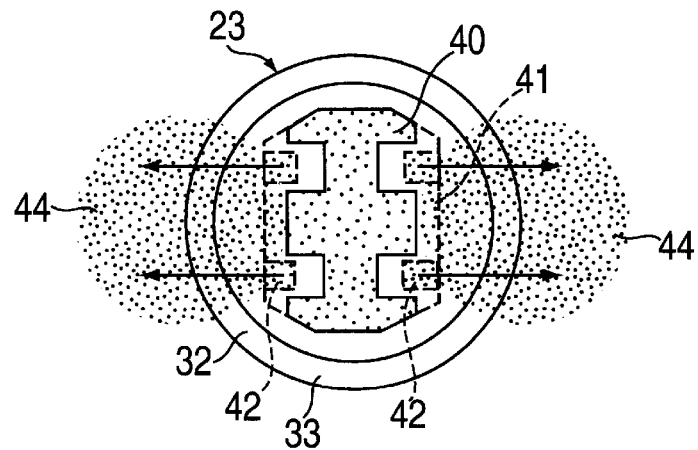
FIG. 4b shows a jet configuration that includes two single jets and can be attained with the orifice plate according to FIG. 4.

FIGS. 4a and 4b show two possible jet configurations that can be attained with an orifice plate illustrated in FIG. 4. The outlet orifices 42 disposed deep in necks 45 permit a flat jet configuration (shown in FIG. 4a), while the increased offset of inlet orifice 40 with respect to outlet orifice 42, and thus outlet orifices 42 lying nearly outside of necks 45, permits a jet configuration encompassing two single jets (shown in FIG. 4b), so this type of orifice plate 23 is particularly suited for so-called dual-jet valves. Likewise, variations in jet configurations are possible with, for example, outlet orifices 42 provided asymmetrically in necks 45. The sprays having the aforementioned jet configurations are indicated by 44. The jet configurations shown in FIGS. 4a and 4b, or variations thereof, can be created with all of the orifice plates 23 shown in FIGS. 2 through 9.

Figure 5:
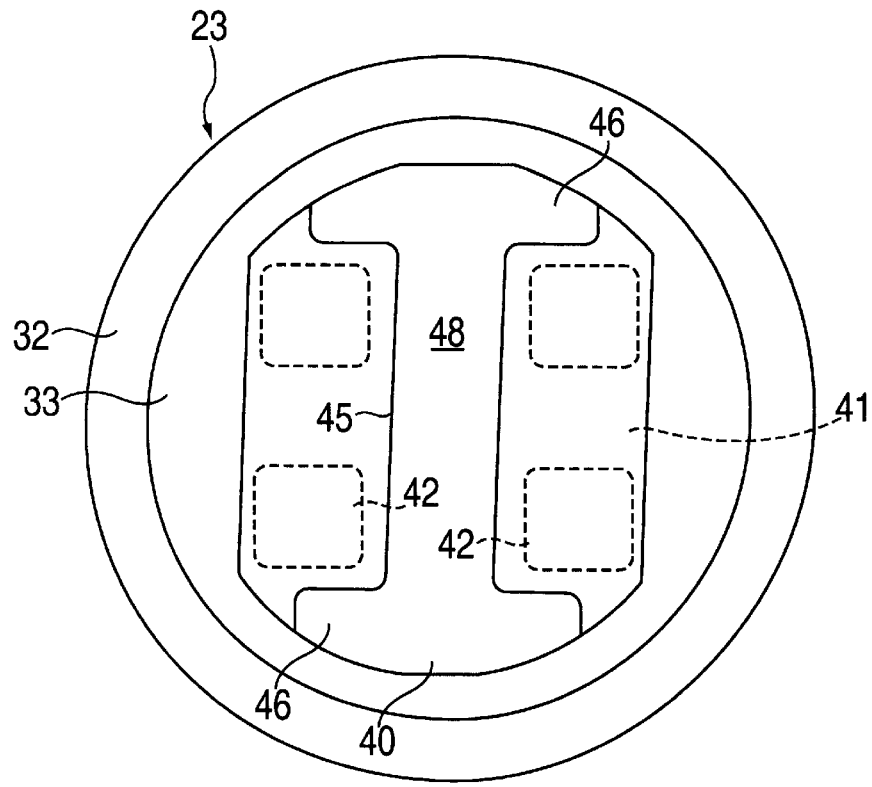
FIG. 5 shows a fourth orifice plate in a plan view.
Figure 6:
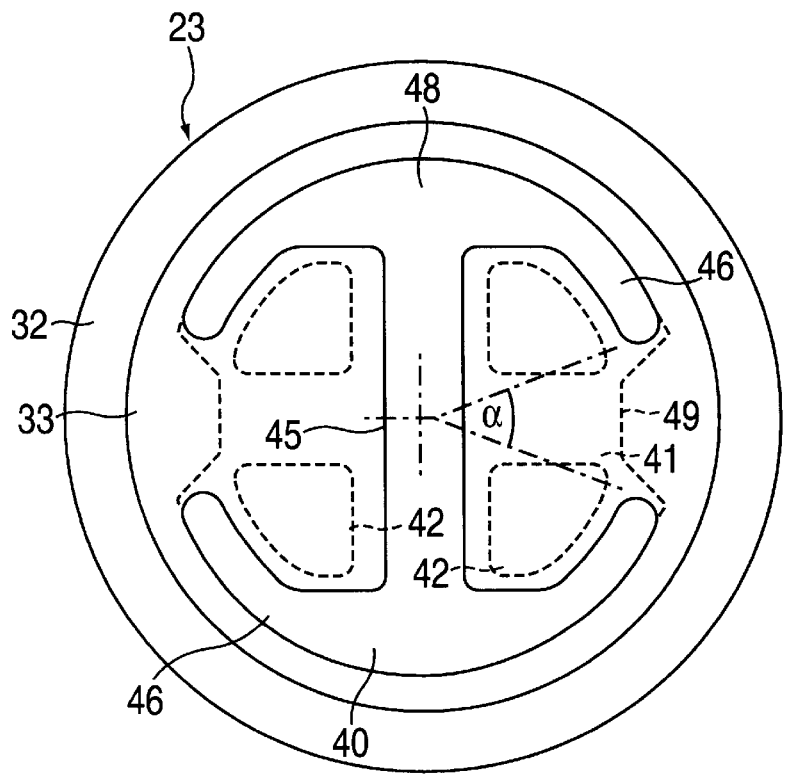
FIG. 6 shows a fifth orifice plate in a plan view.
Figure 7:
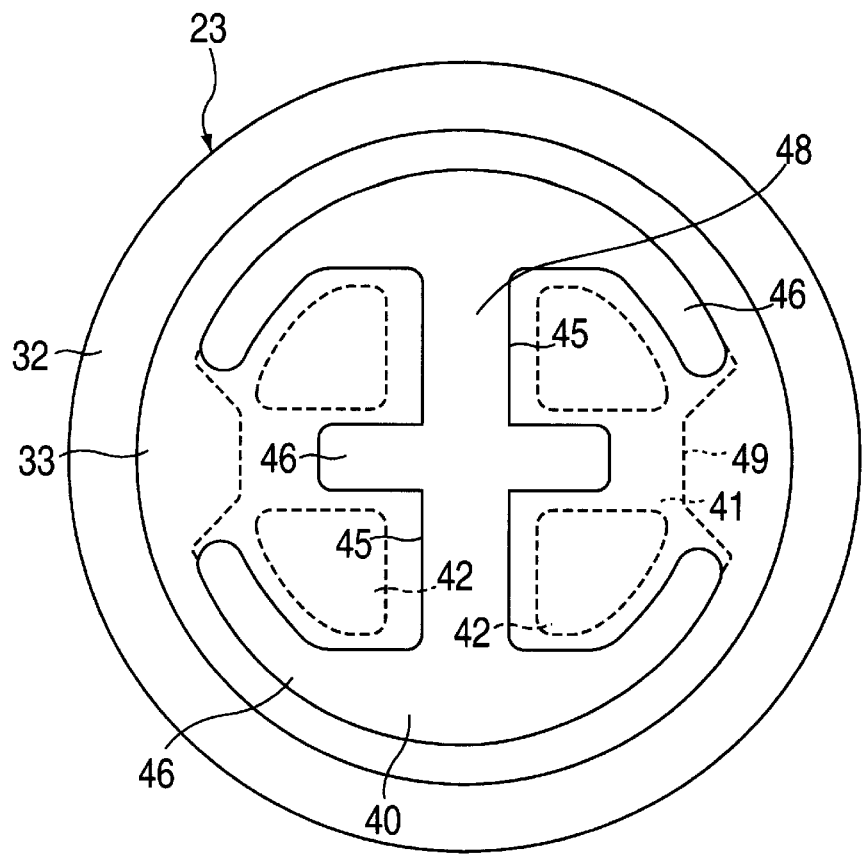
FIG. 7 shows a sixth orifice plate in a plan view.

FIGS. 5, 6 and 7 show exemplary embodiments of orifice plates 23 that represent variations of the orifice plate 23 illustrated in FIG. 4. In all of these exemplary embodiments, channel 41 (cavity) covers all outlet orifices 42, so the fluid can likewise flow into outlet orifices 42 from any location at the circumference. The orifice plate 23 shown in FIG. 5 has an inlet orifice 40 that only has two outer inlet regions 46, and a narrow connecting region 48 formed by necks 45 on both sides is provided between the two inlet regions 46. No center, wide inlet region 46 is formed here, so inlet orifice 40 appears to be shaped like a bone (or a rotary armature or a double-T). Two outlet orifices 42 are respectively positioned at least partially in one of the two necks 45, offset from inlet orifice 40, orifices 40 and 42 are formed in the two different functional levels 37 and 35.

The orifice plate 23 shown in FIG. 6 is obtained by lengthening the two inlet regions 46 of inlet orifice 40 of the orifice plate 23 illustrated in FIG. 5 in a circular-arc shape. Starting from connecting region 48, inlet regions 46 shaped like circular arcs are so wide that their ends are only spaced slightly opposite one another, and virtually form a complete circular ring. The angle α formed by the material in upper functional level 37 between two respective ends of inlet regions 46, the angle starting from the center of the orifice plate, is, for example, 40°, so inlet regions 46 are embodied over about 280°. Inlet orifice 40 thus advantageously possesses a very large circumference. The channel 41, embodied substantially in circular shape in center functional level 36, includes indentations 49 precisely in the regions between respectively two ends of inlet regions 46, the indentations projecting radially inward from the ideal circular shape toward valve longitudinal axis 2. The contour of outlet orifices 42 differs from a rectangle or square; the cross sections of the orifices can be shaped like trapezoids, polygons, rounded rectangles or rounded polygons, displaced (angled) polygons, or even ellipses or circles. Inlet orifices 40 and outlet orifices 42 can be adapted to one another, depending on the desired offset. Inlet regions 46 of inlet orifice 40, which extend very far around, ensure that the flow reaches outlet orifices 42 from numerous sides. The orifice plate 23 shown in FIG. 7 is formed by the combination of the orifice plates 23 of FIGS. 4 and 6, so a central inlet region 46 and the two outer inlet regions 46 form four necks 45, into which outlet orifices 42 are embedded in the projection.

Figure 8:
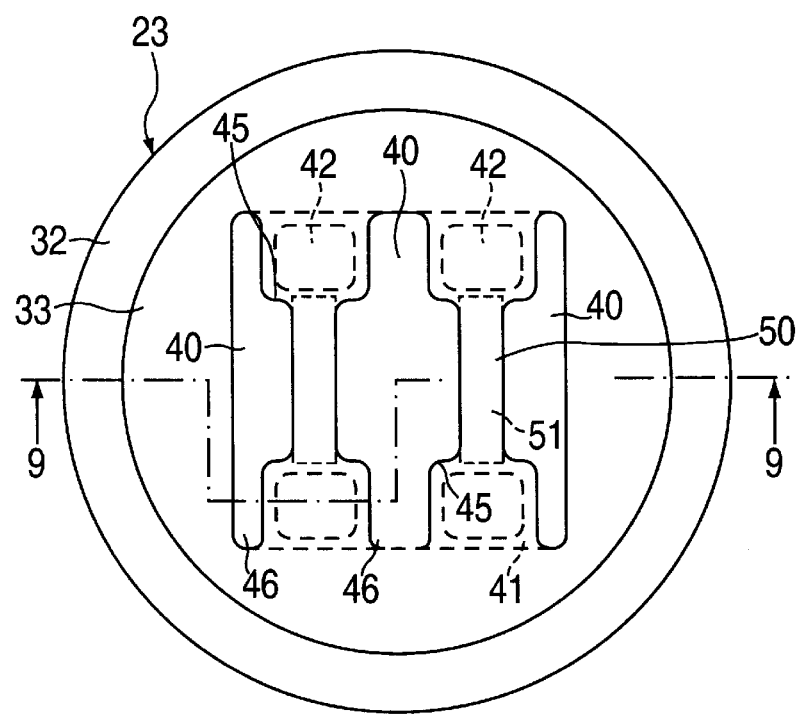
FIG. 8 shows a seventh orifice plate in a plan view.
Figure 9:
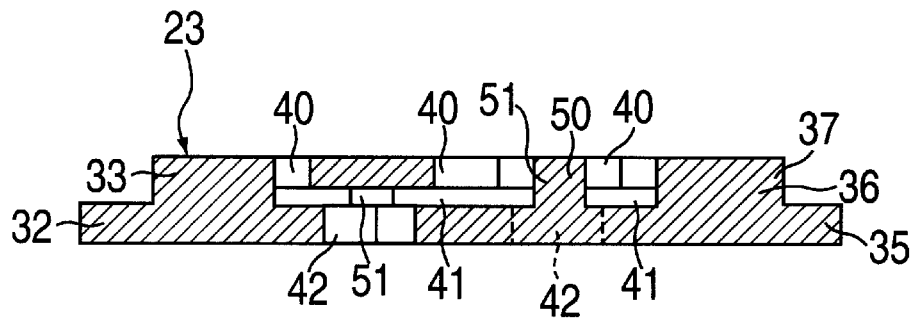
FIG. 9 shows an orifice plate in section along the line IX—IX illustrated in FIG. 8.

FIGS. 8 and 9 show a further embodiment of an orifice plate 23 based on the "bat" inlet orifice 40 illustrated in FIG. 2 or 4, FIG. 9 shows section through orifice plate 23 along the line IX—IX illustrated in FIG. 8. Outlet orifices 42 and channel 41 are largely rectangular, channel 41 again completely covering outlet orifices 42, as in the embodiment illustrated in FIG. 4. One essential feature distinguishes the orifice plate 23 illustrated in FIG. 8 from the orifice plate 23 illustrated in FIG. 4. The formerly one inlet orifice 40 is now in three parts, because said inlet orifice 40 is completely partitioned between two opposite necks 45. Starting from lower functional level 35, metal is deposited in web fashion through electroplating in the two subsequent functional levels 36 and 37, so two web-shaped material regions 50 in upper functional level 37 ensure that inlet orifice 40 is partitioned into three sections, and the web-like material regions 51 below them in center functional level 36 represent material islands within channel 41 that end no further than at outlet orifices 42. Inlet regions 46 of inlet orifices 40 respectively extend precisely to the wall of channel 41.

Primarily the flat jet construction and the jet construction comprising two (symmetrical) single jets shown in FIGS. 4a and 4b can be attained with the orifice plates 23 shown in FIGS. 2–9. In this context, larger jet angles are created with orifice plates 23 having bat-like inlet orifices 40 than with orifice plates 23 having bone-shaped inlet orifices 40 (given comparable outlet orifices 42). The degree of the offset between inlet orifices 40 and outlet orifices 42 is also significant for the jet angles.

Figure 10:
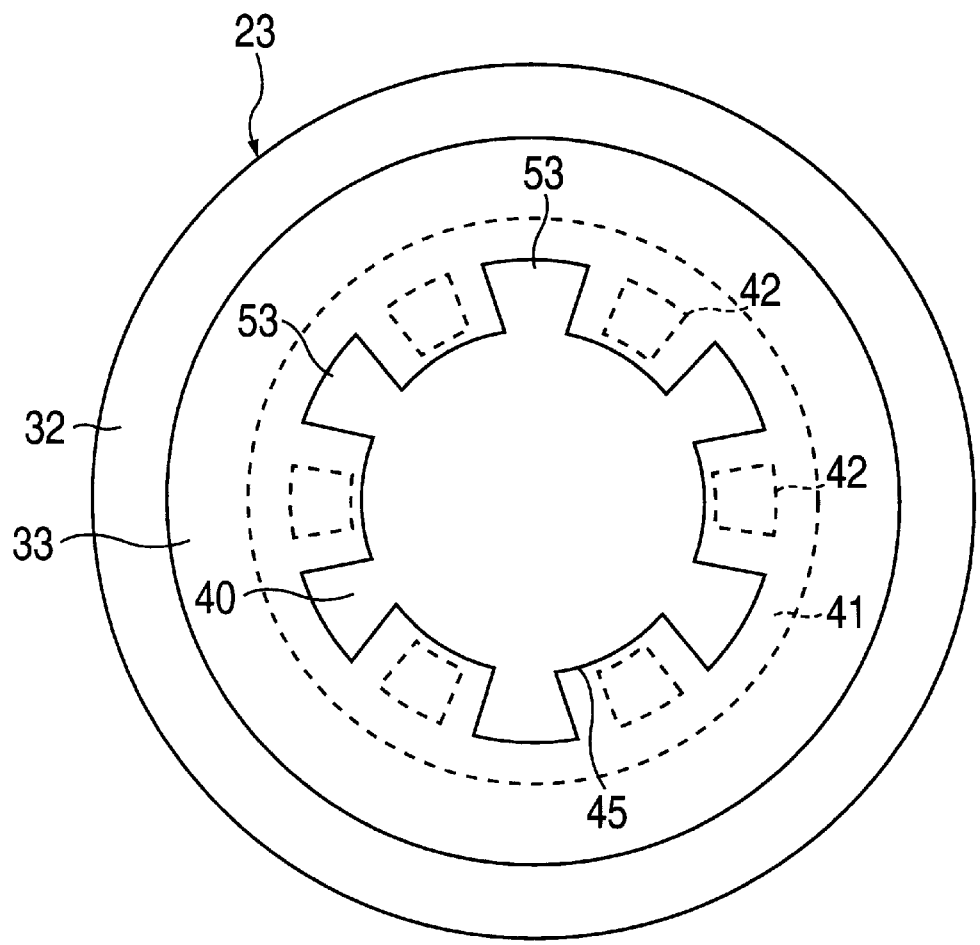
FIG. 10 shows an eighth orifice plate in a plan view.

The inlet orifice 40 of the orifice plate 23 shown in FIG. 10 has a circular base shape. Seen in the direction of the circumference, a plurality of necks 45, for example six, are provided starting from the circumference, tooth-like dents 53 automatically extending radially outwardly in each case. Dents 53 are distributed uniformly over the circumference of inlet orifice 40, for example; namely, six dents 53 are positioned at every 60°. The contour of the cross-section of inlet orifice 40 is therefore similar to a gear. The six, for example, rectangular or trapezoidal outlet orifices 42 are disposed or embedded with offset in necks 45 of inlet orifice 40. Outlet orifices 42 project radially outward, for example not beyond the outer circumference of inlet orifice 40. In this embodiment, inlet orifice 40 has a particularly large circumference, which is especially advantageous, as will become apparent in a later observation of the cross-section regions that are flowed through. The circular channel 41 is selected to be large enough that it completely covers both inlet orifice 40 and outlet orifices 42. Fluid therefore flows through outlet orifice 42 from all sides. This orifice plate 23 can be used to attain a conical jet configuration.

Figure 11:
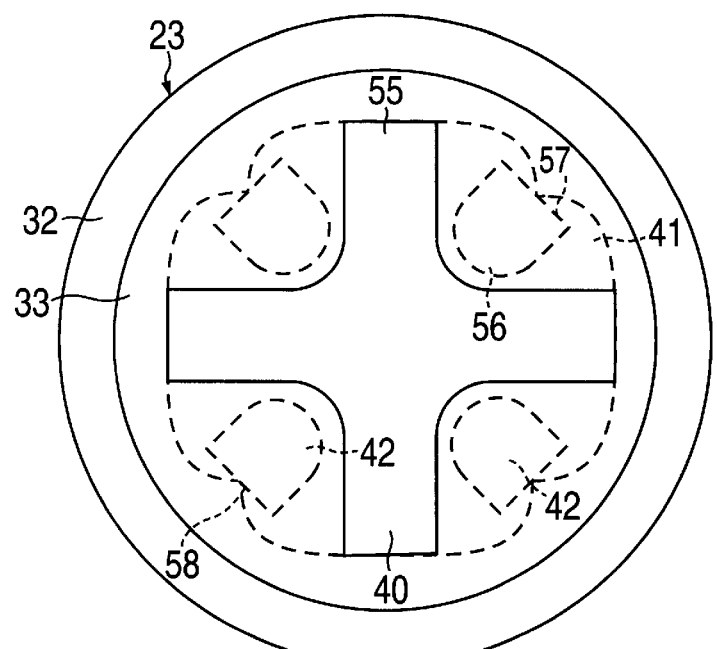
FIG. 11 shows a ninth orifice plate in a plan view.
Figure 12:
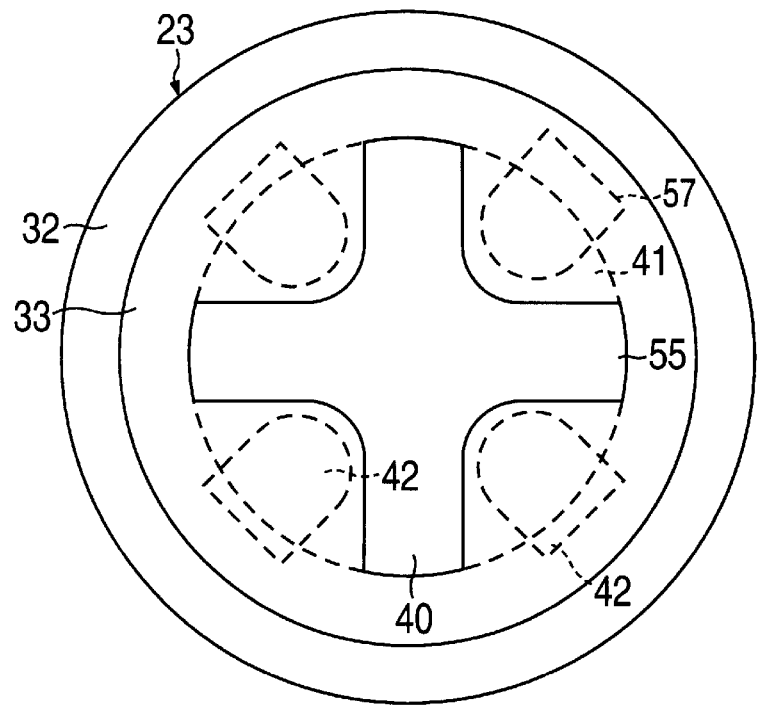
FIG. 12 shows a tenth orifice plate in a plan view.

FIGS. 11 and 12 show orifice plates 23 with largely cross-shaped inlet orifices 40. The transitions of the individual legs 55 of the cross of inlet orifice 40 are rounded, for example. The four legs 55 extend radially outward from valve longitudinal axis 2, with 90° spacing from one another, and areas are formed by the cross shape between respectively two adjacent legs 55, similarly to the necks 45 of the orifice plate 23 illustrated in FIG. 4, an outlet orifice 42 being correspondingly disposed in these areas in lower functional level 35, with slight offset with respect to inlet orifice 40. Outlet orifices 42 are rounded on their side 56 facing valve longitudinal axis 2, and specifically with a radius that corresponds to, for example, the radius of the rounded transitions of legs 55. In contrast to the rounded side 56 of outlet orifices 42, which side faces valve longitudinal axis 2, on the opposite side 57 oriented radially outward, outlet orifices 42 have a substantially angled contour, these outer sides 57 that limit outlet orifices 42 being slightly arched, for example, and outlet orifices 42 as a whole having a skylight shape, or a shape similar to a tunnel opening. It is conceivable, however, for outlet orifices 42 to have completely different contours.

Figure 11A:
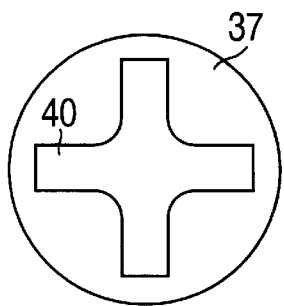
FIG. 11a shows a first functional level of the orifice plate illustrated in FIG. 11.
Figure 11B:
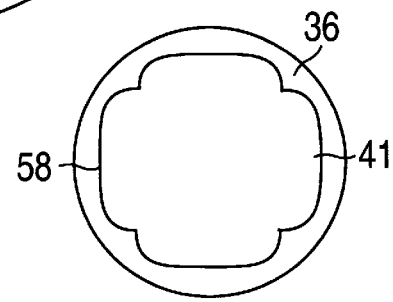
FIG. 11b shows a second functional level of the orifice plate illustrated in FIG. 11.
Figure 11C:
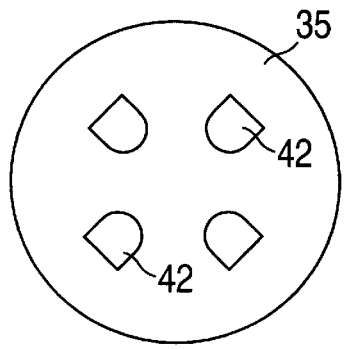
FIG. 11c shows a third functional level of the orifice plate illustrated in FIG. 11.

In the orifice plate 23 shown in FIG. 11, channel 41 in center functional level 36 is circular for the most part, but in the immediate vicinity of outlet orifices 42, up to their outer sides 57, channel 41 has small, pinched (waist-like) narrow regions 58, acting as flow-guide blades. These narrow regions 58 ensure that the fluid, particularly a fuel, is conducted optimally in channel 41 and can flow specifically to outlet orifices 42. Channel 41 is otherwise cut such that its diameter covers legs 55 of inlet orifice 40, so the walls of inlet orifice 40 that form the ends of legs 55 make a direct transition into the wall of channel 41. FIGS. 11a, 11b and 11c show functional levels 37, 36 and 35 separately, so the orifice regions of each functional level 37, 36 and 35 can be further identified. As can be seen in FIG. 11b, channel 41 in center functional level 36 is shaped like a stylized flower bloom or a four-leaf clover.

Figure 11D:
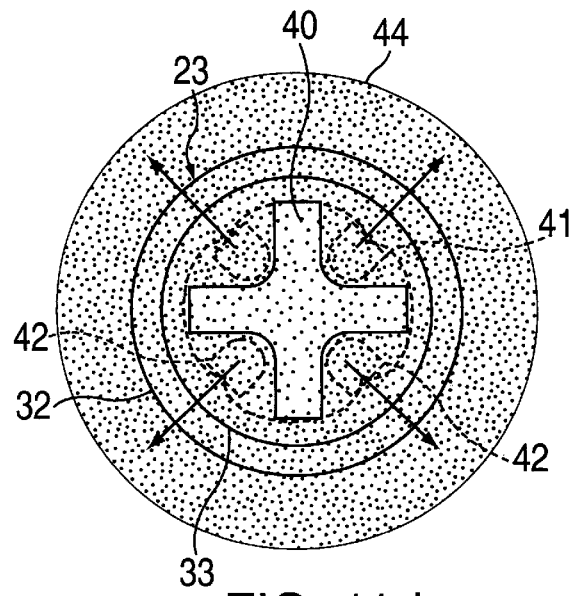
FIG. 11d shows a frustoconical jet configuration that can be attained with an orifice plate illustrated in FIG. 11.

The orifice plate 23 shown in FIG. 12 differs from the orifice plate 23 of FIG. 11 in that channel 41 has a smaller diameter, so outlet orifices 42 protrude partially beyond channel 41. The radially outer sides 57 of outlet orifices 42 therefore lie outside of the wall of channel 41, similarly to the orifice plate 23 shown in FIGS. 2 and 3. In the region of the ends of the four legs 55 of inlet orifice 40, however, the wall limiting channel 41 is exactly downstream of the wall of inlet orifice 40, because (in all of the embodiments) the entire inlet orifice 40 should always be "buried under" channel 41 (covered in the projection). As FIG. 11d shows, orifice plates 23 having cross-shaped inlet orifices 40 (FIGS. 11 and 12) are especially suited for a conical jet spraying for spray 44.

Figure 13:
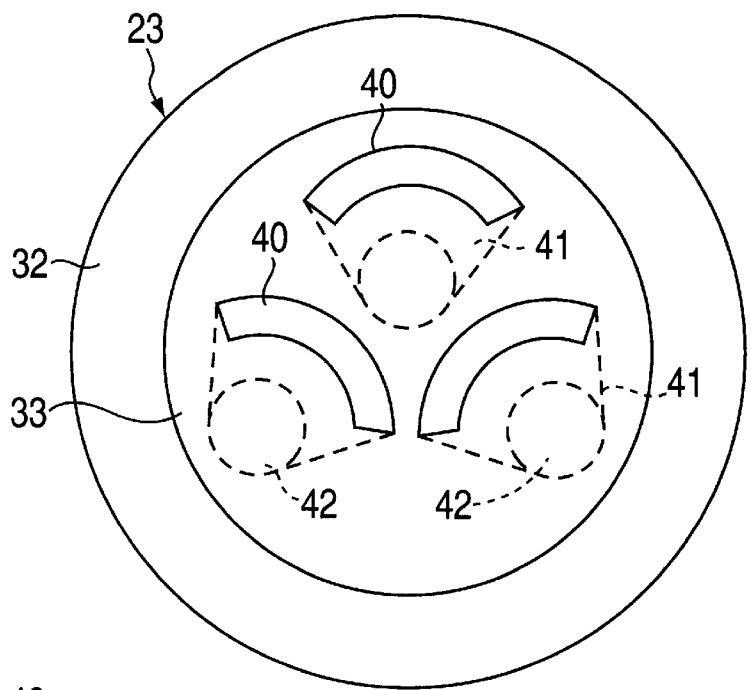
FIG. 13 shows an eleventh orifice plate in a plan view.
Figure 13A:
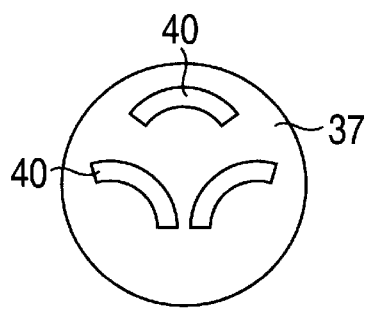
FIG. 13a shows a first functional level of the orifice plate illustrated in FIG. 13.
Figure 13B:
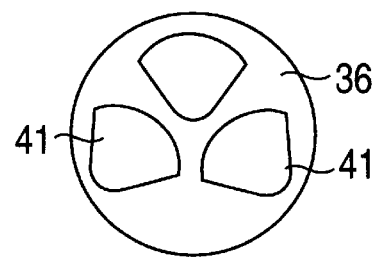
FIG. 13b shows a second functional level of the orifice plate illustrated in FIG. 13.
Figure 13C:
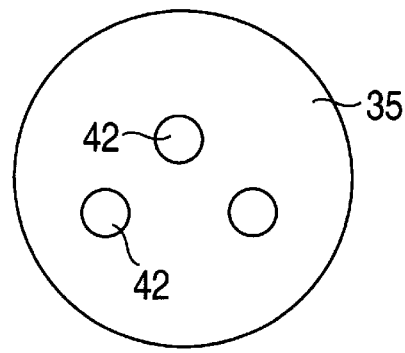
FIG. 13c shows a third functional level of the orifice plate illustrated in FIG. 13.

FIG. 13 shows an orifice plate 23 that has a plurality of inlet orifices 40, for example three. A plurality of channels 41 are now provided as well; exactly one channel 41 and exactly one outlet orifice 42 are associated with each inlet orifice 40. Such orifice plates 23 are especially relevant because they can be used to produce unusual jet configurations. Orifice plate 23 has three functional units, each having one inlet orifice 40, one channel 41 and one outlet orifice 42. Depending on the desired jet configuration, the functional units are disposed asymmetrically or eccentrically around valve longitudinal axis 2, which also always corresponds to the center axis of orifice plate 23. Very good individual jet directions can be attained with this seemingly disordered distribution. In the orifice plate illustrated in FIG. 3, a channel 41, whose contour has a cross section shaped like a sector of a circle, connects an inlet orifice 40 that is sickle-shaped or shaped like a circular-ring segment to a circular outlet orifice 42. Channels 41 always completely bury or cover the associated inlet orifices 40 and outlet orifices 42. Outlet orifices 42 are so disposed that an asymmetrical cone results from the jet configuration, because the individual jets diverge in opposite directions, that is, they widen as they aim in a primary direction diagonally to valve longitudinal axis 2. FIGS. 13a, 13b and 13c show all three functional levels 37, 36 and 35 individually to clarify the orifice contours of the respective functional level 37, 36 and 35.

Figure 15:
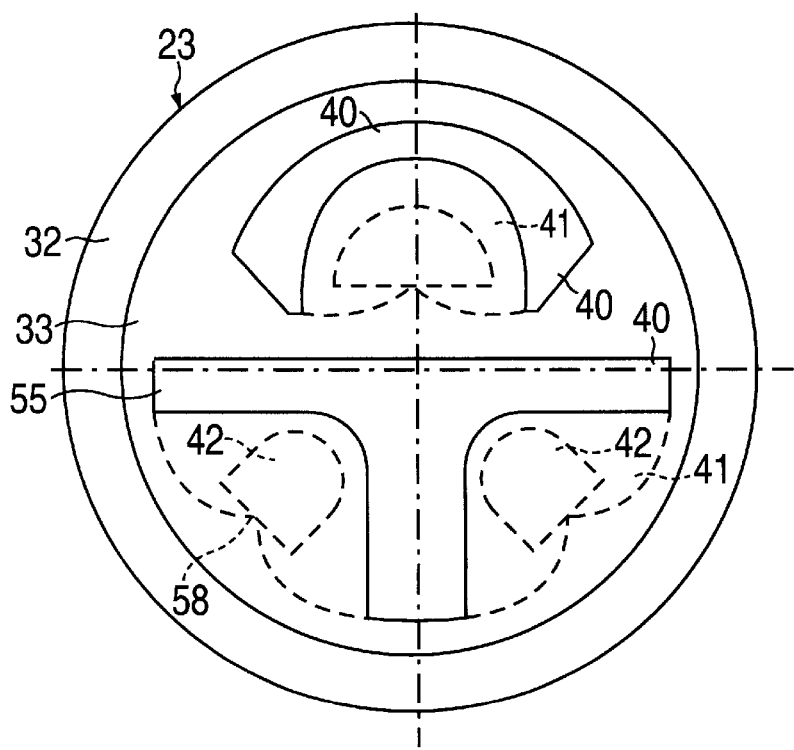
FIG. 15 shows a thirteenth orifice plate in a plan view.
Figure 14A:
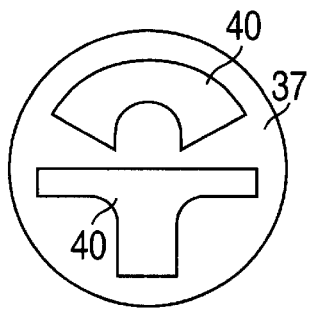
FIG. 14a shows a first functional level of the orifice plate illustrated in FIG. 14.
Figure 14B:
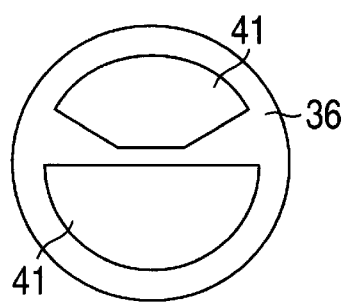
FIG. 14b shows a second functional level of the orifice plate illustrated in FIG. 14.
Figure 14:
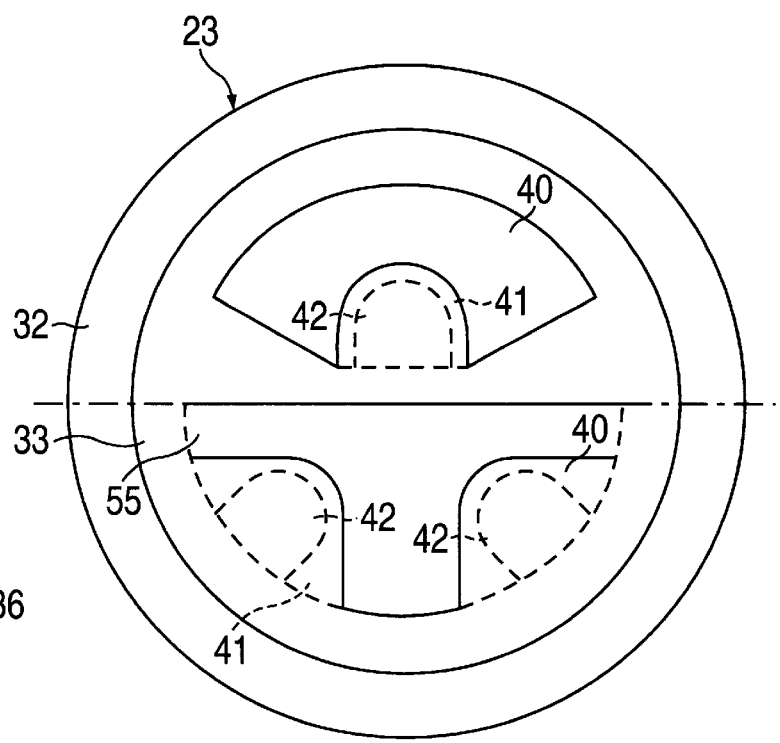
FIG. 14 shows a twelfth orifice plate in a plan view.
Figure 14C:
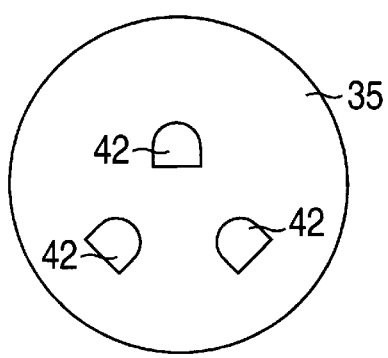
FIG. 14c shows a third functional level of the orifice plate illustrated in FIG. 14.

FIGS. 14 and 15 show two further exemplary embodiments of orifice plates 23 having a plurality of inlet orifices 40, e.g., in this case two. The orifice contours of the two inlet orifices 40 are different, because these orifice plates 23 are also intended to serve in producing diagonal jets or asymmetrical jet configurations. While the one inlet orifice 40 has three legs 55 and is thus T-shaped, the second inlet orifice 40 has the contour of a circular-ring segment having a variable width. Of the three outlet orifices 42, which are again shaped similarly to a tunnel opening, for example, one is associated with the inlet orifice 40 that is shaped like a circular-ring segment and the adjoining channel 41 shaped like a sector of a circle, and two are associated with the T-shaped inlet orifice 40 and the semicircular channel 41 following in the downstream direction, and the outlet orifices are again embedded in the regions between legs 55, namely in the space enclosed by the circular-ring segment of the one inlet orifice 40, similarly to the cross-shaped inlet orifices 40 (shown in FIGS. 11 and 12). FIGS. 14a, 14b and 14c show all three functional levels 37, 36 and 35 individually, giving a very clear illustration of the orifice contours of functional levels 37, 36 and 35, particularly inlet orifices 40 with their large circumferences; although these contours are complicated, they can be produced simply through metal deposition.

FIG. 15 shows several variation options for the exemplary embodiment illustrated in FIG. 14. On the one hand, all of the orifice contours can be changed, for example the widths and lengths of legs 55, that is, the circular-ring segment of inlet orifices 40, or the contour of channel 41 having the narrow regions 58, described above with respect to the orifice plate 23 shown in FIGS. 11 and 11b, which serve in optimizing the flow toward outlet orifices 42. A very good double swirl can be attained in the horizontal plane of the flow with these narrow regions 58 serving as flow guide blades. On the other hand, in the orifice plate 23 shown in FIG. 15, the geometry of the individual orifice regions with respect to one another are offset relative to the orifice plate 23 illustrated in FIG. 14. While valve longitudinal axis 2 or the center axis of orifice plate 23 runs along the wall of the T-shaped inlet orifice 40 in the orifice plate 23 shown in FIG. 14, in the orifice plate 23 shown in FIG. 15, the T-shaped inlet orifice 40 is positioned in upper functional level 37 such that valve longitudinal axis 2 does not run along the wall, but somewhere in the center through inlet orifice 40.

Figure 14D:
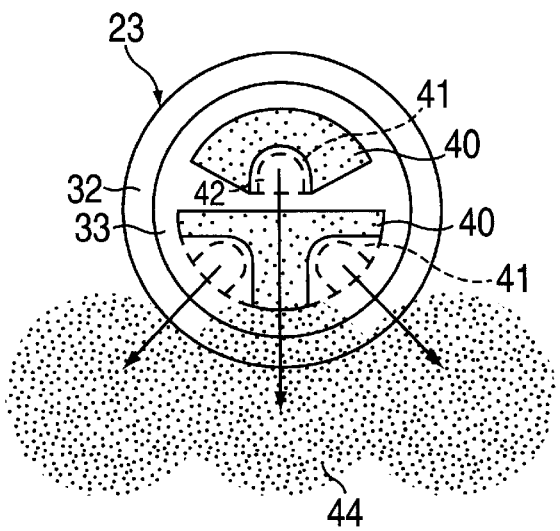
FIG. 14d shows an asymmetrical jet configuration that is directed toward one side and can be attained with the orifice plate illustrated in FIG. 14.

Asymmetrical jet configurations of sprayed sprays 44 can be attained particularly with the orifice plates 23 shown in FIGS. 13, 14 and 15. FIG. 14d illustrates an exemplary asymmetrical jet configuration including three single jets. Such orifice plates 23 are used particularly in so-called diagonal-jet valves. This ensures a very well-directed spray (e.g., onto an intake valve of an internal combustion engine without wetting the wall of an intake pipe), even under unfavorable installation conditions.

Figure 16:
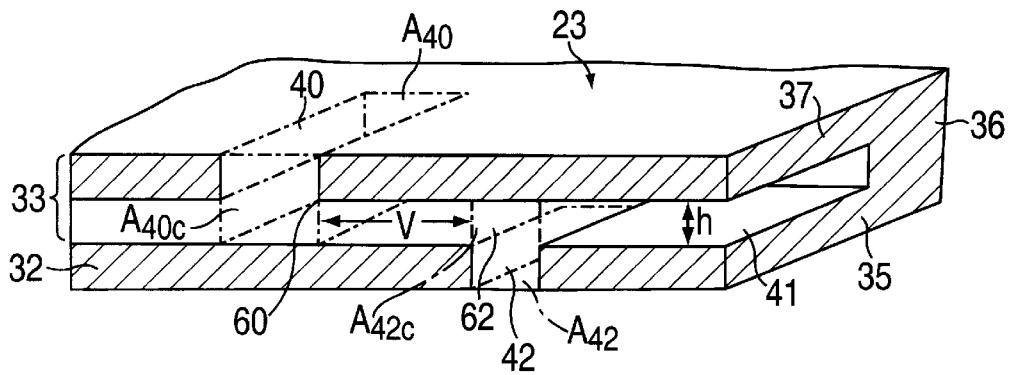
FIG. 16 shows a cut-open orifice plate in simplified form.

FIG. 16 shows an orifice plate 23 that is cut open and in simplified form for explaining important parameters of the orifice plate 23 of the present invention. Decisive variables for influencing the jet configuration of the spray 44 to be sprayed are height h of channel 41 (cavity) and offset v between one or a plurality of inlet-orifice edges 60 facing outlet orifice 42 and one or a plurality of outlet-orifice edges 62 facing inlet orifice 40 in channel 41, i.e. the ratio of v/h. As shown in almost all of the exemplary embodiments, offset v between inlet orifice 40 and outlet orifice 42 is not constant for the most part, so a fluid flowing through channel 41 must traverse different paths from inlet orifice 40 to outlet orifice 42. The ratio of v/h is usually between 0 and 5, particularly between 0 and 2.5, this ratio varying within one and the same orifice plate 23 or from exactly one inlet orifice 40 to exactly one outlet orifice 42.

Figure 17:
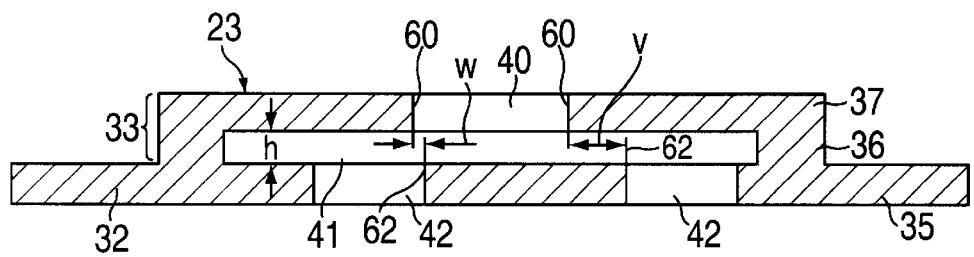
FIG. 17 shows a longitudinal section through an orifice plate explaining an offset or overlap of inlet-orifice edges and outlet-orifice edges.
Figure 18:
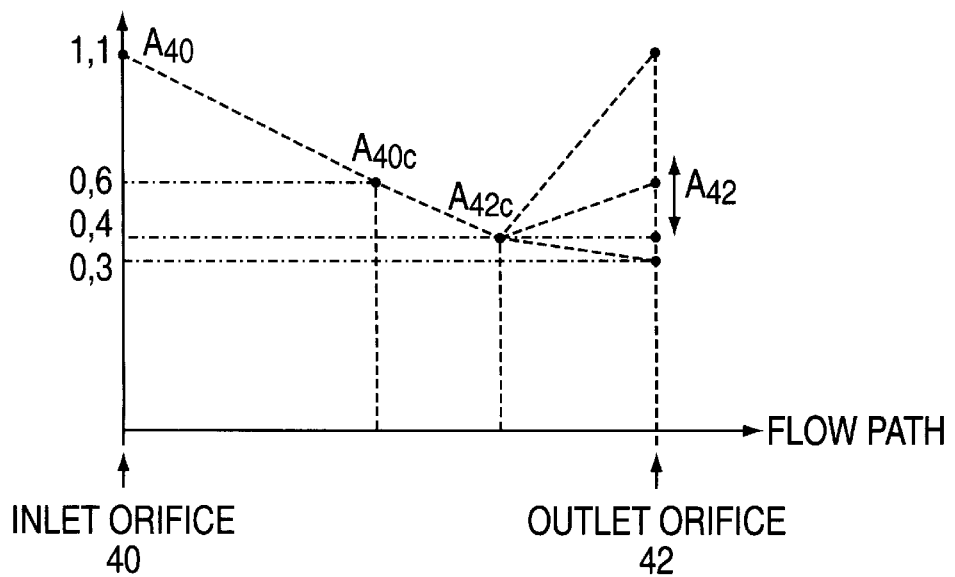
FIG. 18 shows a diagram of the flow cross section over the flow path in an orifice plate according to the present invention with exemplary values for the orifice plate illustrated in FIG. 4.

The longitudinal section through an orifice plate 23 in FIG. 17 is intended to show that an offset v is not an exclusive condition for an S course in the flow in an orifice plate 23 of the invention. Rather, in special cases, it can be desirable to provide a "negative offset" or overlap w of inlet-orifice edges 60 of inlet orifice 40 and outlet-orifice edges 62 of outlet orifice 42. However, to still ensure an S-shaped flow in such an embodiment, overlap w must be selected to be only very small. The ratio of w/h is therefore only between 0 and 1. The values 0 are attained for the ratios of v/h and w/h if offset v or overlap w is 0, that is, inlet-orifice edges 60 and outlet-orifice edges 62 are positioned exactly vertically (axes are parallel) one above the other.

As mentioned above in reference to the size of the circumference of inlet orifices 40, the surface areas in orifice plate 23 that are flowed through are critical for an optimum application of orifice plates 23 as S-type plates. Assuming a limited size of orifice plate 23 (e.g., a 2.5-mm diameter of base region 32 and a 2.1-mm diameter of orifice-plate region 33), which results from continuously decreasing valve or nozzle dimensions and thus continuously decreasing installation spaces, the orifice plate 23 embodied as an S-type plate should be hydraulically unthrottled. To keep the throttling effect of inlet orifice 40 as small as possible, the entrance cross section of all inlet orifices 40 should generally be larger than the exit cross-section of all outlet orifices 42 of an orifice plate 23. The surface areas to be considered, or their relationships to one another, are described in detail in conjunction with the diagram shown in FIG. 18.

A disadvantage of throttled orifice plates 23, in which the desired surface-area ratios for the orifice plate 23 of the invention are not considered, is that a pressure loss (pulse loss) occurs in the entrance of orifice plate 23, limiting the flow rate in an undesirable manner. This results in an insufficient flow pressure or flow pulse (flow energy losses) for an optimum atomization of the fluid. Moreover, if the relative entrance is too small, the tolerances and fluctuations of the flow quantities to be sprayed increase. Two variables that have a decisive impact on the flow ratios are an entrance cross-sectional surface area $A_{40c}$ and an exit cross-sectional surface area $A_{42c}$ in channel 41. Inlet orifice 40, that is to say, the sum of all of the inlet orifices 40, has a cross-sectional surface area $A_{40}$ that is set in upper functional level 37. The same applies for outlet orifice 42, i.e. the sum of all of the outlet orifices 42 having the cross-sectional surface area $A_{42}$ in lower functional level 35.

Cross-sectional surface areas $A_{40}$ and $A_{42}$ represent the actual, set, open surface areas in the inlet or outlet of the entire orifice plate 23. Starting from these two cross-sectional surface areas $A_{40}$ and $A_{42}$, the two cross-sectional surface areas $A_{40c}$ and $A_{42c}$ are set perpendicular to the first two surface areas. Entrance cross-sectional surface area $A_{40c}$ is the product of the sum of the circumferences of inlet orifices 40 and height h of channel 41; exit cross-sectional surface area $A_{42c}$ is formed by multiplying the sum of the circumferences of all outlet orifices 42 by height h of channel 41. The diagram shown in FIG. 17, which contains exemplary values for an orifice plate 23 illustrated in FIG. 4, clearly shows that $A_{40} > A_{40c} > A_{42c}$ should apply for the unthrottled orifice plate 23. To ensure that entrance cross-sectional surface area $A_{40c}$ is large relative to exit cross-sectional surface area $A_{42c}$ given predetermined, limited installation space, it is advantageous to increase the circumferences of inlet orifices 40. To maintain a high atomization energy in the flow, inlet orifices 40 are not only rectangular, square, circular or elliptical, as in known orifice plates, but, as shown in FIGS. 2–15, are also meandering, bat-shaped, cross-shaped, gear-like, bone-shaped, sickle-shaped, T-shaped, shaped like circular-ring segments or shaped in some other way. No special requirements are placed on the size of cross-sectional surface area $A_{42}$. It can be larger or smaller than exit cross-sectional surface area $A_{42c}$, but can also be identical to it in size. In any event, cross-sectional surface area $A_{42}$ will be smaller than or identical to cross-sectional surface area $A_{40}$.

The exemplary embodiment according to the present invention may be summarized as follows:

1. The jet configuration is primarily influenced by
    offset v,
    the regions of channels 41 that surround outlet orifices 42 in all directions (rear spaces, lateral spaces), and
    the size and shape of outlet orifices 42.
2. The SMD (Sauter Mean Diameter, droplet size in spray 44) is primarily influenced by
    height h and the width of channel 41,
    cross-sectional surface area $A_{40}$ of inlet orifices 40, and
    cross-sectional surface area $A_{42}$ of outlet orifices 42.
3. The statistical spraying quantity is primarily influenced by
    height h of channel 41, and
    cross-sectional surface area $A_{42}$ of outlet orifices 42.

The orifice plates 23 are not all provided exclusively for use at injection valves; they can also be used in, for example, paint nozzles, inhalers or ink-jet printers, in freeze-drying methods, for spraying or injecting fluids, such as beverages, or for atomizing medications. The orifice plates 23 manufactured through multi-layer electroplating and embodied as S-type plates are generally suited for producing fine sprays, for example with large angles.

What is claimed is:

1. An orifice plate composed of at least one metallic material, comprising:
    an upper functional region having at least one inlet orifice;
    a lower functional region having at least one outlet orifice; and
    a center functional region having at least one channel and being positioned between the upper functional region and the lower functional region, the at least one channel facilitating a fluid to completely flow from the at least one inlet orifice to the at least one outlet orifice,
    wherein the upper, lower and center functional regions form a one-piece unit,
    wherein the at least one channel has an entrance cross-sectional surface area and an exit cross-sectional surface area, the entrance cross-sectional surface area being a product of, on the one hand, at least one circumference of the at least one inlet orifice and, on the other hand, a height of the at least one channel transverse to a cross-section of the at least one inlet orifice, the exit cross-sectional surface area being a product of, on the one hand, at least one circumference of the at least one outlet orifice and, on the other hand, a height of the at least one channel transverse to a cross-section of the at least one outlet orifice, and
    wherein the entrance cross-sectional surface area is larger than the exit cross-sectional surface area.

2. The orifice plate according to claim 1, wherein the orifice plate is used in an injection valve.

3. The orifice plate according to claim 1,
    wherein the at least one inlet orifice includes a plurality of inlet orifices, and
    wherein a sum of further cross-sectional surface areas of all of the plurality of inlet orifices is greater than the entrance cross-sectional surface area.

4. The orifice plate according to claim 1, wherein the at least one inlet orifice has a first contour, and the at least one outlet orifice has a second contour, the first contour being different from the second contour.

5. The orifice plate according to claim 1,
    wherein the at least one inlet orifice includes a plurality of inlet orifices, and the at least one outlet orifice includes a plurality of outlet orifices, and
    wherein a sum of first cross-sectional surface areas of all of the plurality of outlet orifices is smaller than a sum of second cross-sectional surface areas of all of the plurality of inlet orifices.

6. The orifice plate according to claim 1, wherein each of the at least one channel is connected to at least one respective orifice of the at least one inlet orifice and completely buries the at least one respective orifice, the at least one respective orifice being completely covered by the at least one channel.

7. The orifice plate according to claim 1, wherein each of the at least one channel is connected to at least one respective orifice of the at least one outlet orifice and at least partially covers the respective orifice.

8. The orifice plate according to claim 1, wherein a number of the at least one inlet orifice is not equal to a number of the at least one outlet orifice.

9. The orifice plate according to claim 1, wherein the at least one inlet orifice does not overlap the at least one outlet orifice and is positioned at an offset from the at least one outlet orifice.

10. The orifice plate according to claim 1, wherein at least one of the upper, lower and center functional regions is electro-deposited on at least another one of the upper, lower and center functional regions.

11. The orifice plate according to claim 1, wherein the upper, lower and center functional regions are multi-layer-electroplated on one another.

12. The orifice plate according to claim 10, wherein each of the upper, lower and center functional regions has a corresponding characteristic orifice structure, each of the corresponding characteristic orifice structure being different from an immediately following characteristic orifice structure in a flow direction.

13. The orifice plate according to claim 12, wherein a number of the upper, lower and center functional regions is at least as great as one of a number of electroplate layers and a number of necessary electroplating steps producing layers.

14. The orifice plate according to claim 1,
    wherein the upper functional region has a single inlet orifice,
    wherein the center functional region has a single channel connected to the single inlet orifice, and
    wherein the lower functional region has a plurality of outlet orifices connected to the single channel.

15. The orifice plate according to claim 14, wherein the single inlet orifice has a shape substantially corresponding to one of a stylized bat shape and a double-H shape.

16. The orifice plate according to claim 15,
    wherein the upper functional region includes a center inlet region, two outer inlet regions and neck portions formed between the center and outer inlet regions, the neck portions separating one of the center and outer inlet regions from another one of the center and outer inlet regions, and wherein the plurality of outlet orifices is at least partially disposed in the neck portions.

17. The orifice plate according to claim 14, wherein the single inlet orifice has a shape substantially corresponding to one of a bone shape, a rotary armature shape and a double-T shape, wherein the upper functional region includes, neck regions, two outer wide inlet regions and a narrow connecting region coupling one of the two outer wide inlet regions to another one of the two outer wide inlet regions, the plurality of outlet orifices being at least partially disposed in the neck regions as a function of the narrow connecting region.

18. The orifice plate according to claim 14, wherein the single inlet orifice has a shape substantially similar to a gear wheel shape, and wherein the upper functional region includes a plurality of tooth-like dents situated at the circumference of the single inlet orifice and extending from a circular internal region of the single inlet orifice, the plurality of outlet orifices being at least partially disposed between the plurality of tooth-like dents.

19. The orifice plate according to claim 14, wherein the single inlet orifice is cross-shaped and has four legs, the four leg situated between the plurality of outlet orifices.

20. The orifice plate according to claim 1, wherein the at least one inlet orifice includes at least two inlet orifices, each of the at least two inlet orifices being connected to the at least one channel, the at least one channel being connected to the at least one outlet orifice.

21. The orifice plate according to claim 20, wherein at least one of the at least two inlet orifices has a T-shape.

22. The orifice plate according to claim 20, wherein at least one of the at least two inlet orifices has a shape substantially corresponding to one of a sickle shape and a segment shape of a circular ring.

23. The orifice plate according to claim 20, wherein the at least one channel has at least two channels, wherein a number of the at least two channels corresponds to a number of the at least two inlet orifices and the at least one outlet orifice, and wherein one of the at least two channels connects only one of the at least two inlet orifices to a respective one of the at least one outlet orifice.

24. The orifice plate according to claim 1, wherein the at least one channel has narrow regions extending toward the at least one outlet orifice and acting as flow-guide blades.

25. The orifice plate according to claim 1, wherein the at least one inlet orifice and the at least one outlet orifice are asymmetrically distributed over a surface area of the orifice plate.

26. The orifice plate according to claim 1, wherein the upper functional region and the center functional region form an orifice-plate region having a first outer diameter, and the lower functional region forms a base region having a second outer diameter, the first outer diameter being smaller than the second outer diameter.

27. A valve having a longitudinal valve axis, comprising:

a valve seat body having a valve seat surface;

a valve closing body interacting with the valve seat surface; and an orifice plate composed of at least one metallic material and situated downstream of the valve seat surface, the orifice plate including:

an upper functional region having at least one inlet orifice, a lower functional region having at least one outlet orifice, and a center functional region having at least one channel and being positioned between the upper functional region and the lower functional region, the at least one channel facilitating a fluid to completely flow from the at least one inlet orifice to the at least one outlet orifice, wherein the upper, lower and center functional regions form a one-piece unit, wherein the at least one channel has an entrance cross-sectional surface area and an exit cross-sectional surface area, the entrance cross-sectional surface area being a product of, on the one hand, at least one circumference of the at least one inlet orifice and, on the other hand, a height of the at least one channel transverse to a cross-section of the at least one inlet orifice, the exit cross-sectional surface area being a product of, on the one hand, at least one circumference of the at least one outlet orifice and, on the other hand, a height of the at least one channel transverse to a cross-section of the at least one outlet orifice, and wherein the entrance cross-sectional surface area is larger than the exit cross-sectional surface area.

28. The valve according to claim 27, wherein the valve is a fuel-injection valve for a fuel-injection system of an internal combustion engine.

29. The valve according to claim 27, wherein the at least one inlet orifice includes a plurality of inlet orifices, and wherein a sum of further cross-sectional surface areas of all of the plurality of inlet orifices is greater than the entrance cross-sectional surface area.

30. The valve according to claim 27, wherein the valve seat body has a downstream end forming a further outlet orifice, wherein the upper and center functional regions of the orifice plate form an orifice-plate region having a first outer diameter, and the lower functional region forms a base region having a second outer diameter, the first outer diameter being smaller than the second outer diameter, and wherein the orifice-plate region projects into the further outlet orifice, and the base region rests against a lower end face of the valve seat body.

31. The valve according to claim 30, further comprising:

an orifice-plate carrier securely connecting the orifice plate to the valve seat body.

* * * * *